United States Patent [19]

Rey

[11] Patent Number: 5,413,822
[45] Date of Patent: May 9, 1995

[54] ARTICLE OF PLASTIC MATERIAL AT LEAST A PART OF THE OUTER SURFACE OF WHICH IS DECORATED

[75] Inventor: Michel Rey, Neuchâtel, Switzerland

[73] Assignee: ETA SA Fabriques d'Ebauches, Grenchen, Switzerland

[21] Appl. No.: 155,212

[22] Filed: Nov. 22, 1993

[30] Foreign Application Priority Data

Nov. 25, 1992 [FR] France .................. 92 14285

[51] Int. Cl.⁶ .................. B32B 3/10; C09K 19/00
[52] U.S. Cl. .................. 428/1; 428/203; 63/3
[58] Field of Search .................. 428/1, 203; 63/3

[56] References Cited

U.S. PATENT DOCUMENTS 3,469,749 9/1969 Tabata .................. 224/4
3,908,052 9/1975 Sanders .................. 428/1

FOREIGN PATENT DOCUMENTS 0372436 6/1990 European Pat. Off. .
0400220 12/1990 European Pat. Off. .
2630678 11/1989 France .

Primary Examiner—Alexander S. Thomas
Attorney, Agent, or Firm—Pollock, Vande Sande & Priddy

[57] ABSTRACT

The present invention concerns an article, in particular a part of a bracelet (21) for watches, having a base (22) formed by an elastomer, an outer surface (24) of such base including a decoration (25). The decoration (25) comprises a decorative pattern (29) obtained at least in part by a thermochromic ink (30) comprising liquid crystals incorporated into micro capsules, such thermochromic ink being inserted between two intermediate layers (26 and 32) formed of thermofusible materials.

8 Claims, 2 Drawing Sheets

ARTICLE OF PLASTIC MATERIAL AT LEAST A PART OF THE OUTER SURFACE OF WHICH IS DECORATED

The present invention concerns an article of plastic material, at least a part of the outer surface of which exhibits a decorative pattern.

More specifically, the present invention concerns a flexible object having a base formed by elastomers and a decoration located on the surface of such base. The ink used for at least a part of the decorative pattern includes liquid crystals and gives rise to a thermochromic effect of the decorative pattern, that is to say, at least a partial variation of the colour of the decorative pattern as a function of the temperature of the outer layer of the decorated article.

Although the present invention can be applied to various articles, the interest hereinafter is more specifically in bracelets for watches.

BACKGROUND OF THE INVENTION

In order that a bracelet of flexible synthetic material be judged to have the right quality, it is necessary that it be able to withstand various physical stresses. In particular it is expected of such a bracelet that it retain its physical characteristics, in particular its flexibility and its initial appearance as long as possible. For that it is necessary in particular that it withstand in a reversible manner certain mechanical stresses associated with the use of a wristwatch.

FIG. 1 describing the prior art shows a bracelet 1 comprising a base 2 formed by a thermoplastic elastomer, in particular polyvinyl chloride or polyurethane to which is hot applied a decoration comprising two thin flexible layers 6 and 8 of polyvinyl chloride or of polyurethane between which a decorative pattern 10 is located.

In the case of a thermochromic ink comprising liquid crystals contained in micro capsules, the use of flexible thin layers of polyvinyl chloride or polyurethane exhibits a major drawback given that liquid crystal inks incorporated in micro capsules exhibit a limitation in the choice of binders.

The binders appropriate to such thermochromic inks generally adhere in an unsatisfactory manner to the thermoplastic elastomers cited hereinbefore and used for the manufacture of bracelets, that is to say, the adhesion of thermochromic ink with such elastomers does not satisfy the criteria of quality necessary for a bracelet which can undergo multiple physical stresses appropriate to its use.

The purpose of the present invention is to overcome the drawback described hereinbefore in proposing a decorative pattern incorporated in an appropriate multilayer structure.

SUMMARY OF THE INVENTION

The present invention thus concerns an article including a base, formed by at least one first elastomer, and a decoration provided on at least one outer surface of said base, said decoration comprising a protective layer and a decorative pattern located between said base and said protective layer, such article being characterized in that said decorative pattern comprises at least one primary design formed by at least one thermochromic ink including liquid crystals, said decoration comprising a first intermediate layer located between said base and said primary design and a second intermediate layer located between said primary design and said protective layer, such first and second intermediate layers being formed of thermofusible materials.

There results from these characteristics that the thermochromic ink used for the primary design exhibits a good adhesion with the two intermediate layers and that the intermediate layers adhere solidly to the base and to the protective layer which guarantees a good cohesion of the assembly.

In a specific embodiment of the invention, the decorative pattern comprises a secondary design located between the second intermediate layer adjacent the protective layer and such protective layer, the inks used for such secondary design being ordinary inks adhering correctly to the protective layer.

Such specific embodiment of the invention enables the obtaining of design effects which are particularly interesting. It is thus possible to have a decorative pattern exhibiting a primary thermochromic design and a secondary design invariant with temperature and contrasting with the primary design.

In a variant of this specific embodiment of the invention the primary design is formed by a film uniformly covering over the decorated surface.

The invention will be better understood with the help of the description to follow and drawings which illustrate it solely by way of example.

DESCRIPTION OF THE PREFERRED EMBODIMENTS

Figure 1:
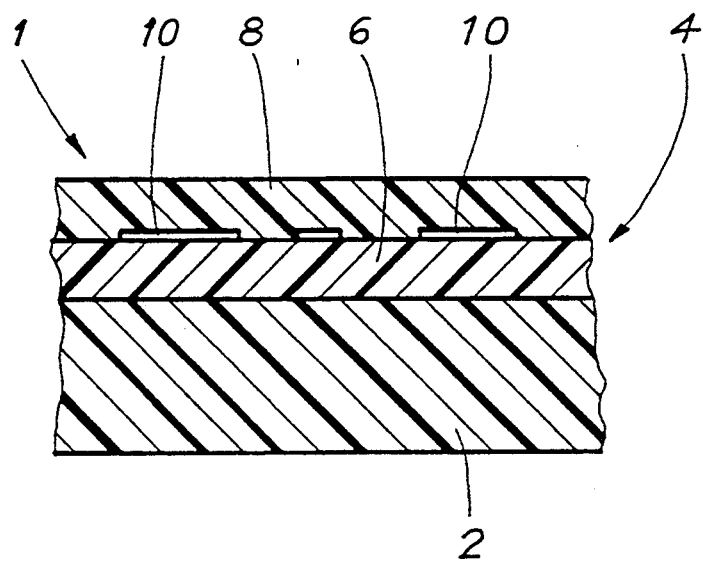
FIG. 1 already described shows schematically a transversal cross-section of a part of a bracelet of flexible plastic from the prior art comprising a decorative pattern.
Figure 2:
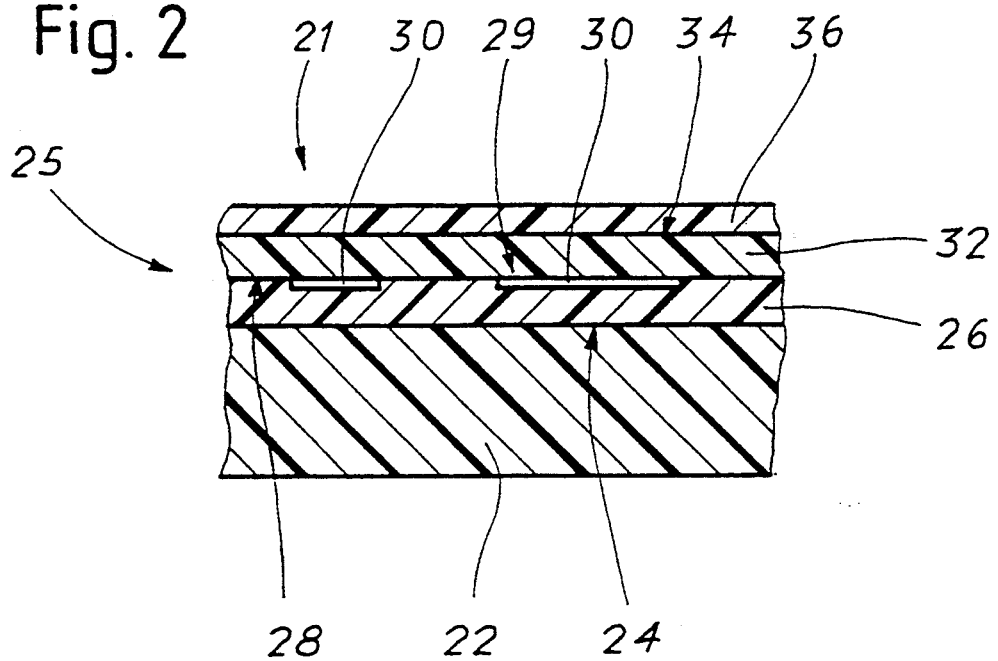
FIG. 2 shows schematically a transversal cross-section of a part of a bracelet of flexible plastic comprising a decorative pattern obtained by means of at least one thermochromic ink according to a first embodiment of the invention.

Referring hereinafter to FIG. 2, there will be described a first embodiment of the invention. It will be noted that the transversal cross-section of a portion 21 of a bracelet shown on this FIG. 2 is schematic and does not represent the relative thickness of the different films or layers shown.

The part 21 of said bracelet comprises a base 22 formed by a thermoplastic elastomer, for example of polyvinyl chloride or of polyurethane. On the outer surface 24 of such base 22 is provided a decoration 25 comprising a first layer 26 formed by a flexible thermofusible material. On the outer surface 28 of this first layer 26 is printed a decorative pattern 29 forming a primary design by means of at least one thermochromic ink 30 comprising liquid crystals incorporated into micro capsules. On the first flexible layer 26 is provided a second layer 32 formed by a flexible thermofusible material which covers over the decorative pattern 29, this latter being thus inserted between the first and second layers 26 and 32.

On the outer surface 34 of the second layer 32 is provided a protective layer 36 formed by a thermoplastic elastomer or by an appropriate protective film.

Thus, the decorative pattern 29 obtained by means of at least one thermochromic ink comprising micro capsules of liquid crystals is inserted between two intermediate layers 26 and 32 formed by flexible thermofusible materials, located between a base 22 and a protective layer 36.

The thermofusible materials used are chosen as a function of their flexibility and their capacity to adhere solidly to the elastomers and to the thermochromic inks employed.

In a preferred embodiment of the invention, the thermofusible materials forming the intermediate layers 26 and 32 belong to the class of polyamide base copolymers. This class of materials exhibits a good adhesion to thermochromic inks having liquid crystals and with the elastomers. However, any other thermofusible material whatsoever exhibiting the adhesion and flexibility characteristics required is susceptible to be used in the present invention.

The intermediate layers 26 and 32 thus form adhesion interfaces between the thermochromic inks and the outer layers 22 and 36 formed of elastomers.

In a preferred variant of this first embodiment according to the invention, the base 22 is of polyurethane while the protective layer 36 is of polyvinyl chloride.

Figure 3:
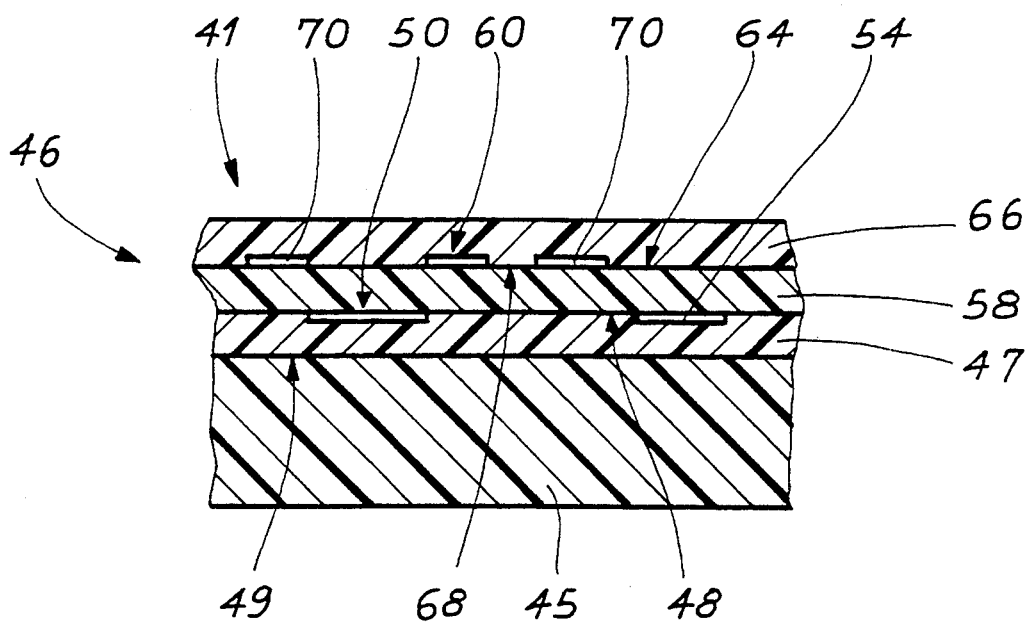
FIG. 3 shows schematically a second embodiment of the invention in which the decorative pattern comprises a primary design formed by means of thermochromic inks and a secondary design formed by means of ordinary inks.
Figure 4:
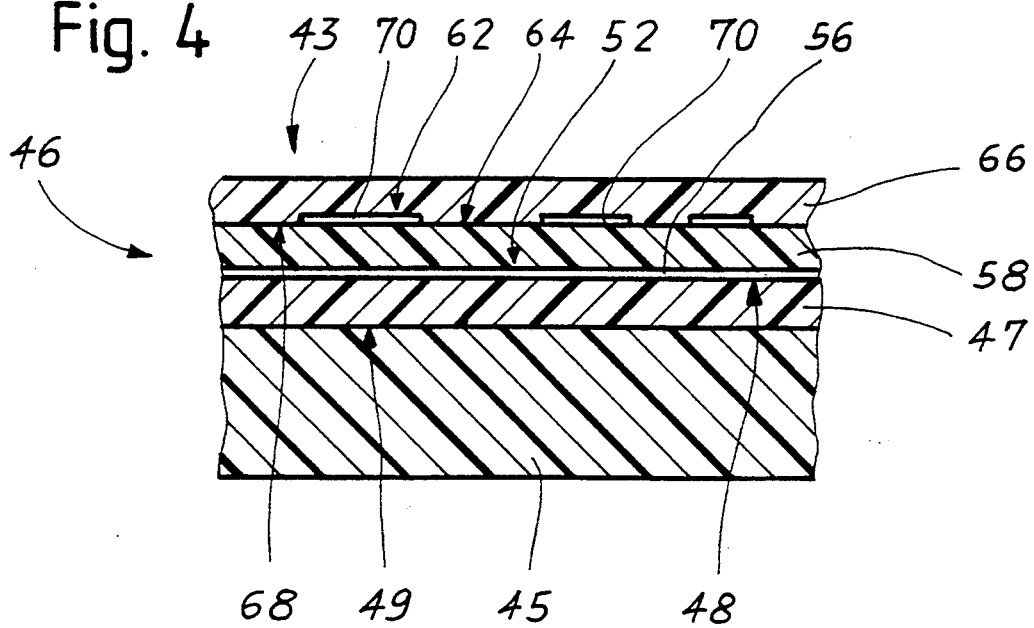
FIG. 4 shows a variant of the second embodiment of the invention in which the primary design is formed by a film of thermochromic ink.

In referring hereinafter to FIGS. 3 and 4, there will be described first and second variants of a second embodiment of a part of a bracelet decorated partially with the help of thermochromic inks according to the invention.

In this second embodiment, the respective portions 41, 43 of said bracelet comprise a base 45 formed by a thermoplastic elastomer and a decoration 46 located on at least a portion 49 of the outer surface of the base, comprising a first layer 47 formed of thermofusible materials similar to those described hereinbefore, on the outer surface 48 of which is printed respective primary designs 50, 52 formed by means of thermochromic inks respectively 54, 56 comprising liquid crystals.

The primary design 52 of the second variant is formed by a film uniformly covering over the decorated surface of the bracelet. In this second variant, the second layer 58 of thermofusible materials is located entirely on film 52 from whence the absolute necessity of good adhesion of the thermochromic ink 56 with the intermediate layers 47 and 58.

Given that the thermochromic effect of the inks 54 and 56 generally requires a relatively dark background, respective secondary designs 60 and 62 are printed on the inner surface 64 of the protective layer 66 formed by a transparent elastomer, this protective layer 66 being located on the outer surface 68 of the second layer 58. Nevertheless, in another variant (not shown), it is possible to provide that the secondary design be located between the base and the first intermediate layer.

The secondary design 60, 62 is formed with the help of an ordinary ink 70, preferably of a bright contrasting tone. Naturally, the secondary design 60, 62 can include various inks successively printed on the internal surface 64 of the protective layer 66.

In the same manner, the primary design 50, 52 of the second embodiment and the decorative pattern of the first embodiment of the invention described hereinbefore can be obtained by means of various thermochromic inks comprising liquid crystals incorporated into micro capsules and exhibiting different ranges of sensitivity to the extent that they respond to the required criteria of compatibility.

As is well understood, the person skilled in the art will be capable of imagining from the description which has just been given, by way of illustration and in no manner limiting, various variants which do not leave the framework of the present invention.

Finally, it will be noted that it is possible, in a variant of the invention, to provide an ink of liquid crystals exhibiting transparency in one of its states.

What is claimed is:

1. An article including a base formed of at least one first elastomer, and a decoration provided on at least one outer surface of said base, said decoration comprising:

a protective layer;
   a decorative pattern located between said base and said protective layer, said decorative pattern comprising at least one primary design formed by at least one thermochromic ink including liquid crystals;
   a first intermediate layer located between said base and said primary design; and,
   a second intermediate layer located between said primary design and said protective layer, each of said first and second intermediate layers being formed of at least one polyamide base copolymer.

2. An article as set forth in claim 1, wherein said liquid crystals are incorporated into micro capsules.

3. An article as set forth in claim 1, wherein said protective layer is formed of at least one second elastomer.

4. An article as set forth in claim 1, wherein said decorative pattern comprises a secondary design formed by at least one ordinary ink, said secondary design being located between said second intermediate layer and said protective layer.

5. An article as set forth in claim 1, wherein said primary design is formed by a film of thermochromic ink uniformly covering over said decorated surface.

6. An article as set forth in claim 1, wherein said protective layer is formed of polyvinyl chloride.

7. An article as set forth in claim 1, wherein said base is formed of polyurethane.

8. An article as set forth in claim 1, said article forming part of a watch bracelet.

* * * * *